(12) United States Patent
Bowen

(10) Patent No.: US 6,533,692 B1
(45) Date of Patent: Mar. 18, 2003

(54) DRIVETRAIN WITH HYBRID TRANSFER CASE

(75) Inventor: Thomas C. Bowen, Rochester Hills, MI (US)

(73) Assignee: New Venture Gear, Inc., Troy, MI (US)

(*) Notice: Subject to any disclaimer, the term of this patent is extended or adjusted under 35 U.S.C. 154(b) by 0 days.

(21) Appl. No.: 10/044,395

(22) Filed: Oct. 19, 2001

(51) Int. Cl.⁷ ................................................. F16H 3/72
(52) U.S. Cl. .......................................................... 475/5
(58) Field of Search ............................... 475/2, 3, 4, 5, 475/6, 151; 180/65.2, 247

(56) References Cited

U.S. PATENT DOCUMENTS

| | | | |
|---|---|---|---|
| 4,410,071 A | * 10/1983 | Osterman | 475/5 |
| 6,041,877 A | 3/2000 | Yamada et al. | |
| 6,048,289 A | 4/2000 | Hattori et al. | |
| 6,059,064 A | 5/2000 | Nagano et al. | |
| 6,083,138 A | 7/2000 | Aoyama et al. | |
| 6,083,139 A | 7/2000 | Deguchi et al. | |
| 6,098,733 A | 8/2000 | Ibaraki et al. | |
| 6,110,066 A | 8/2000 | Nedungadi et al. | |
| 6,116,363 A | 9/2000 | Frank | |
| 6,146,302 A | 11/2000 | Kashiwase | |
| 6,176,808 B1 | * 1/2001 | Brown et al. | 477/5 |
| 6,184,603 B1 | * 2/2001 | Hamai et al. | 477/3 X |
| 2002/0050259 A1 | * 5/2002 | Kojima | 180/65.2 X |
| 2002/0086755 A1 | * 7/2002 | Hamai | 475/5 |
| 2002/0107101 A1 | * 8/2002 | Bowen et al. | 475/5 |
| 2002/0157890 A1 | * 10/2002 | Williams | 180/249 |

FOREIGN PATENT DOCUMENTS

JP 406144020 * 5/1994 ................ 180/65.2

* cited by examiner

*Primary Examiner*—Sherry Estremsky
*Assistant Examiner*—Roger Pang
(74) *Attorney, Agent, or Firm*—Harness, Dickey & Pierce P.L.C.

(57) ABSTRACT

A hybrid transfer case includes a mainshaft, front and rear output shafts, an electric motor/generator connected to the mainshaft, and an input clutch for selectively coupling the transmission to the mainshaft. The transfer case further includes a planetary gearset having a sun gear driven by the mainshaft, a ring gear, and planet gears supported from a carrier. The carrier drives the rear output shaft and a transfer assembly couple to the front output shaft. A direct clutch is operable to selectively coupled the carrier for rotation with the mainshaft. A low brake is operable to selectively brake rotation of the ring gear. A transfer clutch controls the amount of drive torque delivered through the transfer assembly to the front output shaft. A hybrid control system is provided for controlling actuation of the various clutch and brake assemblies and the electric motor/generator to establish various drive modes.

42 Claims, 8 Drawing Sheets

| MODE | INPUT CLUTCH | DIRECT CLUTCH | LOW BRAKE | MOTOR/ GENERATOR |
|---|---|---|---|---|
| ELECTRIC LOW | RELEASED | RELEASED | APPLIED | DRIVING |
| HYBRID LOW | APPLIED | RELEASED | APPLIED | DRIVING |
| ENGINE LOW | APPLIED | RELEASED | APPLIED | OFF OR CHARGING |
| ELECTRIC DIRECT | RELEASED | APPLIED | RELEASED | DRIVING |
| HYBRID DIRECT | APPLIED | APPLIED | RELEASED | DRIVING |
| ENGINE DIRECT | APPLIED | APPLIED | RELEASED | OFF OR CHARGING |
| REGENERATIVE BRAKE | APPLIED OR RELEASED | APPLIED OR RELEASED | APPLIED OR RELEASED | CHARGING |
| POWER GENERATION | APPLIED | RELEASED | RELEASED | CHARGING |

*Figure - 7*

DRIVETRAIN WITH HYBRID TRANSFER CASE

FIELD OF THE INVENTION

The present invention relates generally to hybrid drive systems for motor vehicles, and, more specifically, to a hybrid transfer case for use in four-wheel drive vehicles.

BACKGROUND OF THE INVENTION

Automobile manufacturers are actively working to develop alternative powertrain systems in an effort to reduce the level of pollutants exhausted into the air by conventional powertrains equipped with internal combustion engines. Significant development has been directed to electric vehicles and fuel cell vehicles. Unfortunately, these alternative powertrain systems suffer from several disadvantages and, for all practical purposes, are still under development. However, several different hybrid electric vehicles (HEV) have recently been offered for sale. These hybrid vehicles are equipped with an internal combustion engine and an electric motor that can be operated independently or in combination to drive the vehicle.

There are two types of hybrid vehicles, namely, series hybrid and parallel hybrid. In a series hybrid vehicle, power is delivered to the wheels by the electric motor which draws electrical energy from the battery. The engine is used in series hybrid vehicles to drive a generator which supplies power directly to the electric motor or charges the battery when the state of charge falls below a predetermined value. In parallel hybrid vehicles, the electric motor and the engine can be operated independently or in combination pursuant to the running conditions of the vehicle. Typically, the control strategy for such parallel hybrid vehicles utilizes a low-load mode where only the electric motor is used to drive the vehicle, a high-load mode where only the engine is used to drive the vehicle, and an intermediate assist mode where the engine and electric motor are both used to drive the vehicle. Regardless of the type of hybrid drive system used, hybrid vehicles are highly modified versions of conventional vehicles that are expensive due to the componentry, required control systems, and specialized packaging requirements.

Hybrid vehicles have also been adapted to four-wheel drive vehicles and typically utilize the above-noted parallel hybrid powertrain to drive the primary wheels and a second electric motor to drive the secondary wheels. Obviously, such a four-wheel drive system is not only extremely expensive and difficult to package, but is also difficult to control in view of the need to react to instantaneous instances of wheel slip. Thus, a need exists to develop hybrid powertrains for use in four-wheel drive vehicles that utilize many conventional powertain components so as to minimize specialized packaging and reduce cost.

SUMMARY OF THE INVENTION

It is therefore an object of the present invention to provide a hybrid powertrain or drive system for a four-wheel drive vehicle.

In accordance with another object, the four-wheel drive hybrid drive system of the present invention includes a transfer case adapted for conventional connection between the transmission and the front and rear drivelines of the motor vehicle.

According to yet another object, the four-wheel drive hybrid drive system is a parallel-type system with an input clutch and an electric motor/generator integrated into the transfer case.

As a related object, the hybrid drive system of the present invention permits use of the internal combustion engine and the electric motor/generator separately or in combination as power sources for driving the motor vehicle.

As a further object, the hybrid drive system of the present invention utilizes a transfer case having a two-speed planetary gearset which can provide a direct high-range drive ratio and a reduction low-range drive ratio in any of the available (i.e., electric only, internal combustion engine only and hybrid) drive modes.

These and other objects are provided by a hybrid two-speed transfer case having a mainshaft, a rear output shaft, a front output shaft, an electric motor/generator connected to the mainshaft, and an input clutch assembly operable for selectively coupling the transmission output shaft to the mainshaft. The transfer case further includes a planetary gearset having a sun gear driven by the mainshaft, a ring gear, and planet gears supported from a carrier that are meshed with the sun gear and the ring gear. The carrier is arranged to drive a rear output shaft and a drive sprocket of a transfer assembly which also includes a driven sprocket and a power chain connecting the sprockets. A direct clutch assembly is operable in an applied state to couple the carrier for rotation with the mainshaft and is further operable in a released state to permit relative rotation therebetween. A low brake assembly is operable in an applied state to prevent rotation of the ring gear and is further operable in a released state to permit rotation of the ring gear. Finally, a transfer clutch assembly is operably disposed between the driven sprocket and the front output shaft to control the amount of drive torque delivered through the transfer assembly to the front driveline. A hybrid control system including various sensors and a controller are provided for controlling actuation of the various clutch, brake assemblies and the electric motor/generator to permit establishment of various drive modes. These drive modes include an "electric" mode where all motive power is generated by the motor/generator unit, an "engine" mode where all motive power is generated by the internal combustion engine, and a "hybrid" mode where the motive power is generated by both the electric motor/generator and the internal combustion engine. In one preferred arrangement, the hybrid control system includes a hydraulic fluid pressure control system that is integrated into the transfer case and which is operable to control actuation of the various clutch and brake assemblies.

Further areas of applicability of the present invention will become apparent from the detailed description provided hereinafter. It should be understood that the detailed description and specific examples, while indicating preferred embodiments of the present invention, are intended for purposes of illustration only since various changes and modifications within the scope of this particular invention will become apparent to those skilled in the art.

BRIEF DESCRIPTION OF THE DRAWINGS

FIG. 7 is a schematic diagram showing the hybrid powertrain control system associated with the present invention.

DETAILED DESCRIPTION OF THE PREFERRED EMBODIMENT

Figure 1:
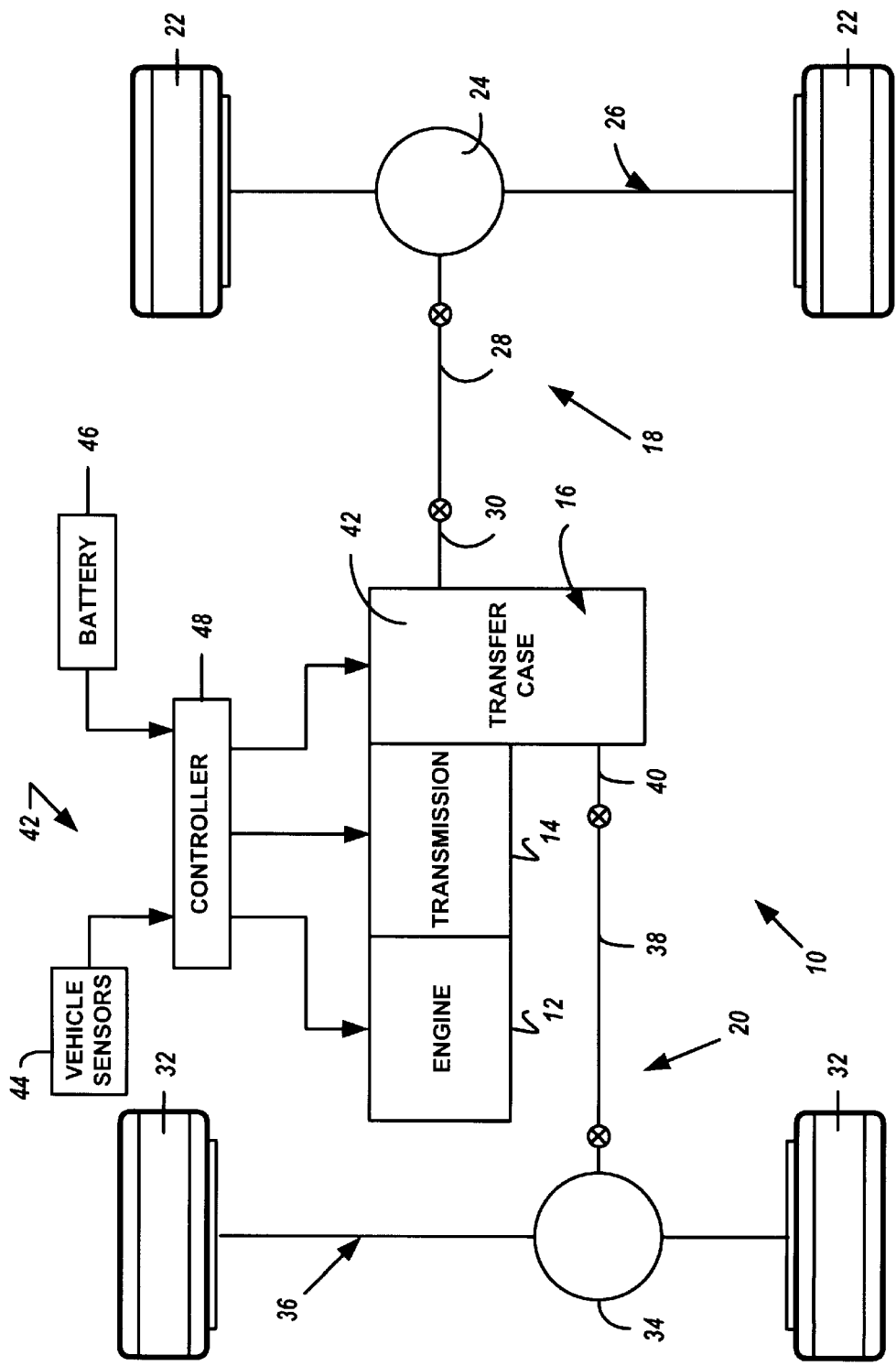
FIG. 1 is a schematic view showing a hybrid powertrain for a four-wheel drive vehicle in accordance with the present invention.
Figure 2:
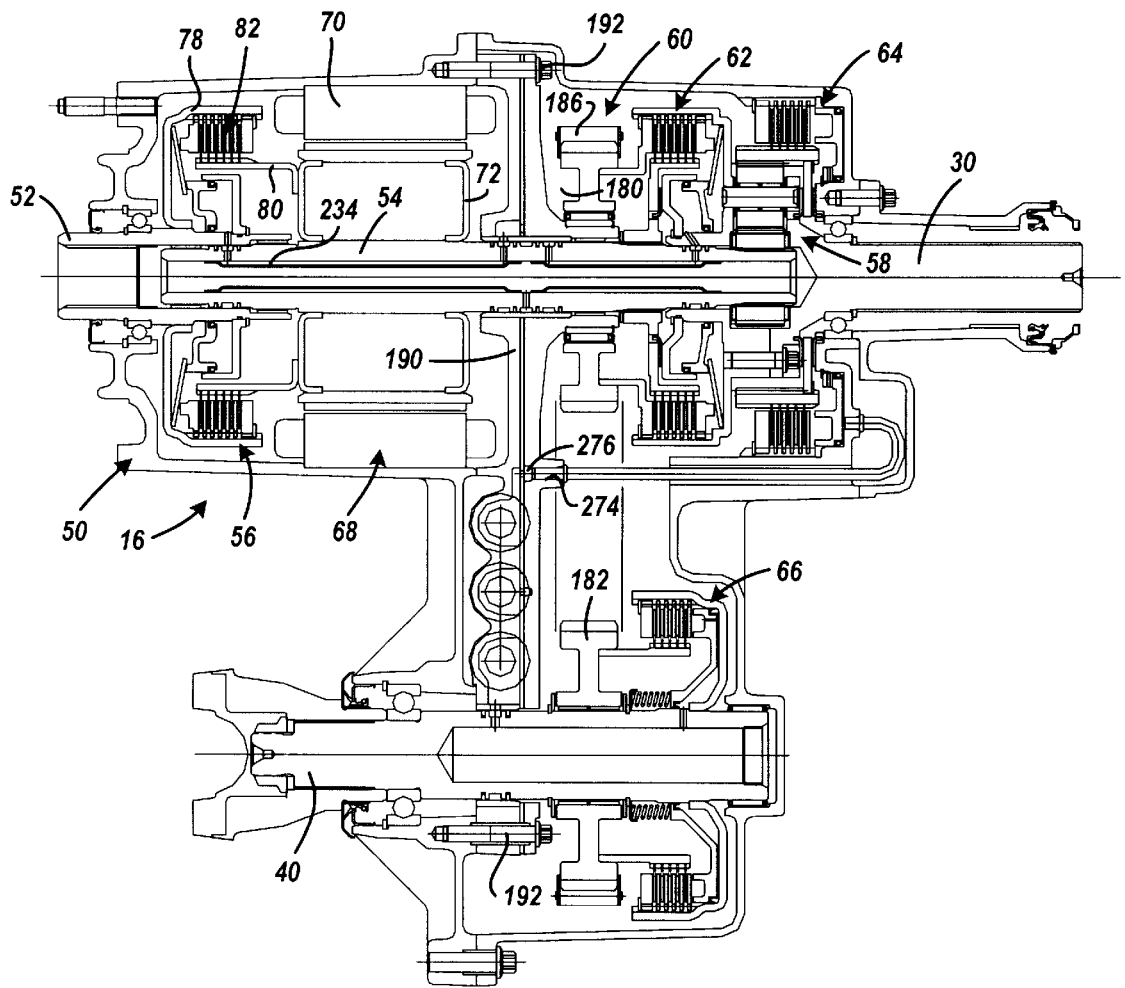
FIG. 2 is a sectional view of the transfer case associated with the hybrid powertrain shown in FIG. 1.

Referring to FIG. 1 of the drawings, a four-wheel drive powertrain 10 for a hybrid motor vehicle is shown to include an internal combustion engine 12, a transmission 14 and a transfer case 16 arranged to transferred motive power (i.e., drive torque) from engine 12 and transmission 14 to a primary driveline 18 and a secondary driveline 20. In the particular arrangement shown, primary driveline 18 is the rear driveline and includes a pair of rear wheels 22 connected to a rear differential unit 24 associated with a rear axle assembly 26. A rear prop shaft 28 interconnects rear differential unit 24 to a rear output shaft 30 of transfer case 16. Secondary driveline 20 is the front driveline and includes a pair of front wheels 32 connected to a front differential unit 34 associated with a front axle assembly 36. A front prop shaft 38 interconnects differential unit 34 to a front output shaft 40 of transfer case 16. Powertrain 10 is also shown to be associated with a powertrain control system 42 generally shown to include an array of vehicle sensors 44, a battery 46 and a controller 48. As will be detailed, controller 48 is operable, among other things, to control actuation of two major sub-systems integrated into transfer case 16. These sub-systems include an electric motor/generator unit and a hydraulic clutch and brake control system.

Referring primarily to FIGS. 2 through 5, the components of transfer case 16 are shown in sufficient detail to provide a clear understanding of its construction and operation. To this end, transfer case 16 is shown to include a housing 50, an input shaft 52 driven by the output shaft of transmission 14, a mainshaft 54, and an input clutch assembly 56 operably disposed between input shaft 52 and mainshaft 54. Transfer case 16 further includes a planetary gearset 58 having an input member driven by mainshaft 54 and an output member driving rear output shaft 30 and a transfer assembly 60. A direct clutch assembly 62 is shown operably disposed between the output member of planetary gearset 58 and mainshaft 54. In addition, a low brake assembly 64 is shown operably disposed between a reaction member of planetary gearset 58 and a portion of housing 50, transfer case 16 also include a transfer clutch assembly 66 that is operably disposed between transfer assembly 60 and front output shaft 40. Finally, an electric motor/generator (M/G) unit 68 is shown to include a stator, 70 fixed to housing 50 and a rotor 72 fixed to mainshaft 54.

Figure 3:
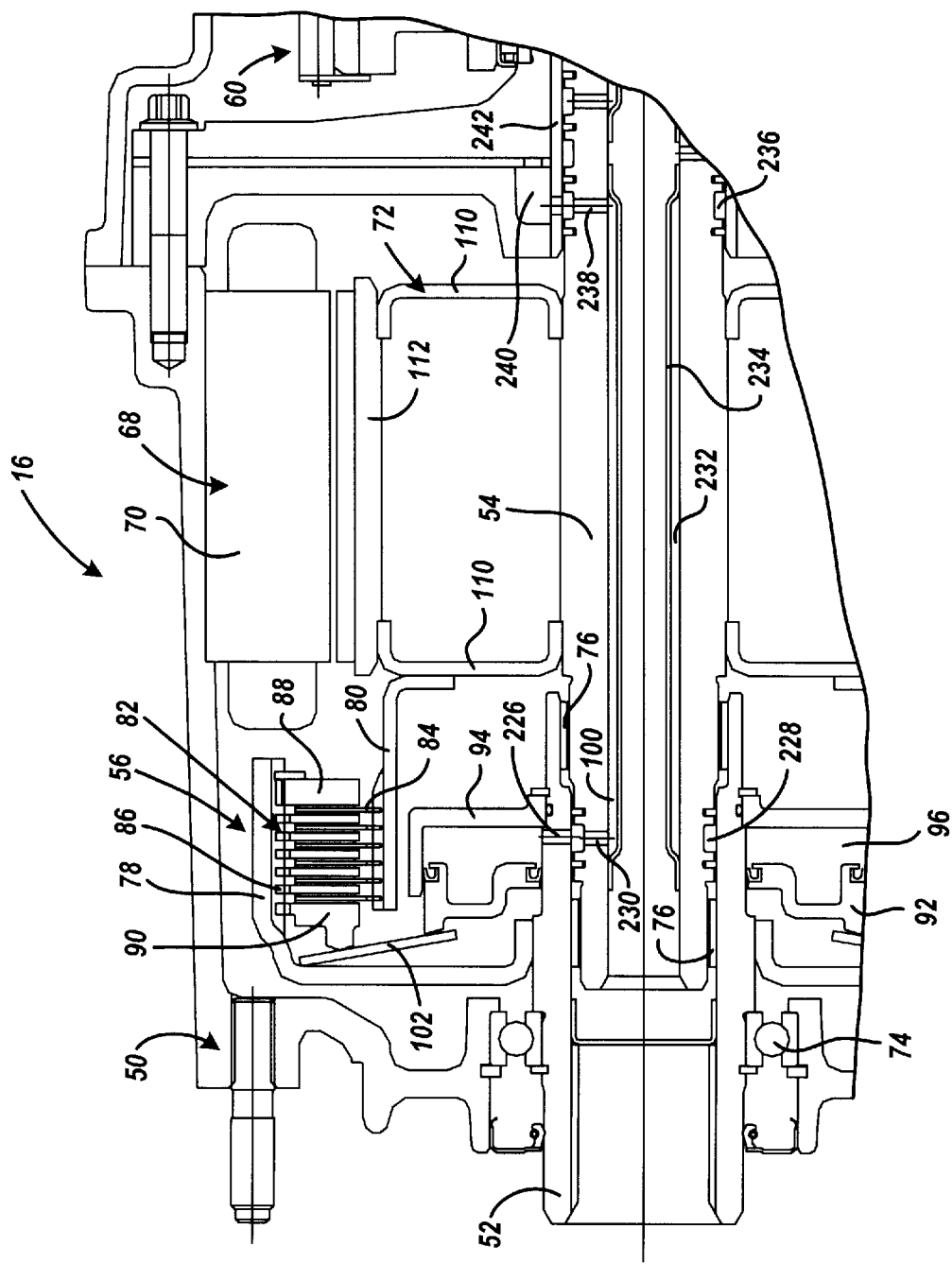
FIG. 3 is an enlarged partial sectional view showing the input clutch assembly in greater detail.

As best seen from FIG. 3, input shaft 52 is rotatably supported from housing 50 by a bearing assembly 74 and a forward end of mainshaft 54 is piloted within input shaft 52 and is supported by journal bearings or bushings 76 for rotation relative thereto. Input clutch assembly 56 is operable in an applied state to couple mainshaft 54 for rotation with input shaft 52 and is further operable in a released state to permit relative rotation therebetween. Input clutch assembly 56 is a spring-apply pressure-release type of arrangement that is normally operable in its applied state. Input clutch assembly 56 includes an annular drum 78 fixed to input shaft 52, a drive hub 80 fixed to rotor 72, and a multi-plate clutch pack 82 therebetween. Clutch pack 82 includes a set of inner plates 84 splined to drive hub 80 and which are interleaved with a set of outer plates 86 splined to drum 78. Clutch pack 82 is disposed between a reaction plate 88 splined to drum 78 and an apply plate 90 likewise splined to drum 78.

A piston 92 is located between input shaft 52 and a piston housing 94 that is journalled on input shaft 52. Piston 92 is sealed between input shaft 52 and piston housing 94 by inner and outer seal rings to define a pressure chamber 96 which is in fluid communication with a first pressure control valve 98 (see FIG. 6) via a first flow pathway 100. A bevel-type apply spring 102 is located within drum 78 and is in engagement with piston 92 and apply plate 90. Spring 102 acts as a lever arm and functions to normally bias piston 92 toward piston housing 94 for exerting a clutch engagement force on apply plate 90 which acts to compress clutch pack 82 and rotatively couple hub 80 to drum 78 such that drive torque is transferred from input shaft 52 through rotor 72 to mainshaft 54. With clutch pack 82 engaged, input clutch assembly 52 is operating in its applied state and power from engine 12 and transmission 14 is transferred to mainshaft 54. When it is desired to shift input clutch assembly 56 into its released state, a volume of high pressure fluid is delivered from first control valve 98 to pressure chamber 96 via first flow pathway 100 for urging piston 92 to move away from piston housing 94 and cause apply spring 102 to resiliently deflect. This action causes apply plate 90 to release its frictional compressive clutch engagement force on clutch pack 82, thereby permitting mainshaft 54 to rotate relative to input shaft 52.

With continued reference to FIG. 3, M/G unit 68 is shown to have wound stator 70 fixed to housing 50 and a multi-piece rotor 72 fixed to mainshaft 54. Specifically, rotor 72 includes a pair of axially-spaced annular end plates 110 that are interconnected by a cylindrical magnetic rotor tube 112. As seen, drive hub 80 is a cup-shaped member that is fixed to one of end plates 110. Electric cables (not shown) are connected to stator 70 and extend through sealed apertures in housing 50 for connection to battery 46 and controller 48 via suitable electrical connectors. Preferably, M/G unit 68 is a permanent magnet d.c. motor.

Figure 4:
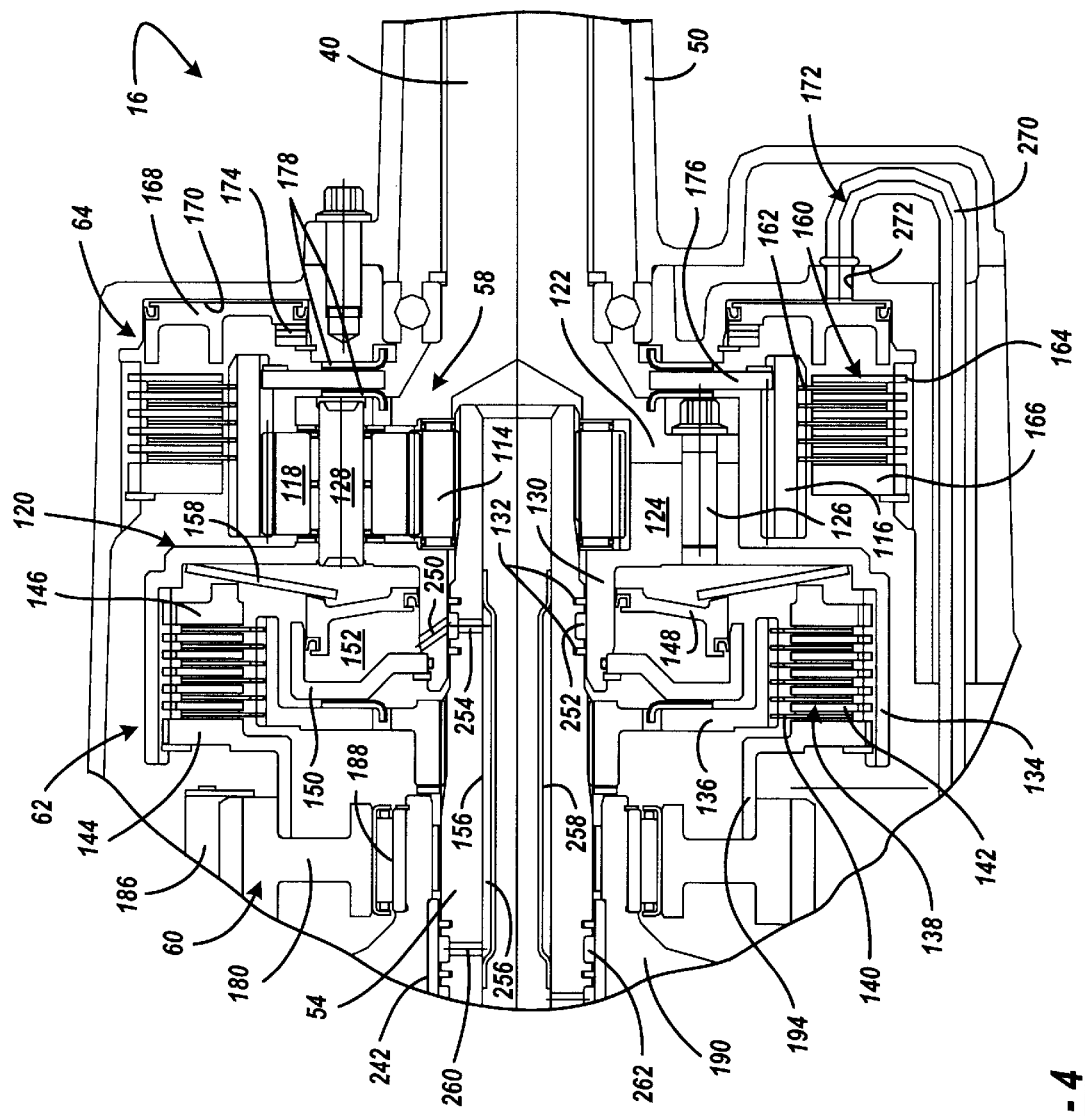
FIG. 4 is an enlarged partial sectional view of the transfer case showing the direct clutch assembly and low brake assembly that are operably for establishing high-range and low-range drive connections across the two-speed planetary gearset.

Referring primarily now to FIG. 4, planetary gearset 58 is shown to include a sun gear 114 splined to the aft end of mainshaft 54, a ring gear 116, and a set of planet gears 118 supported from a carrier assembly 120. Carrier assembly 120 includes a first ring 122 shown to be integral to rear output shaft 30 and a second ring 124 interconnected to first ring 122 by bolts 126. Planet gears 118 are rotatably supported on pinion shafts 128 extending between rings 122 and 124 and are meshed with sun gear 114 and ring gear 116. Second ring 124 includes an axial hub segment 130 that is mounted on mainshaft 54 and sealed relative thereto via a pair of seal rings 132. Second ring 124 also includes a drum segment 134 that is associated with direct clutch assembly 62.

Direct clutch assembly 62 is a spring-apply pressure-release type of arrangement that is normally operable in an applied slate to couple carrier assembly 120 for common rotation with mainshaft 54. Direct clutch assembly 62 is further operable in a released state to permit relative rotation between mainshaft 54 and carrier assembly 120. Direct clutch assembly 62 includes a drive hub 136 splined for rotation with mainshaft 54 and a multi-plate clutch pack 138 disposed between drive hub 136 and drum segment 134 of carrier assembly 120. Clutch pack 138 includes a set of inner plates 140 splined to drive hub 136 and which are interleaved with a set of outer plates 142 splined to drum 134. Clutch pack 138 is located between a reaction plate 144 splined to drum 134 and an apply plate 146 also splined to drum 134. A piston 148 is supported between hub segment 130 of second carrier ring 124 and a piston housing 150 that is journalled on and sealed relative to hub segment 130. Piston 148 is sealed by inner and outer seal rings relative to piston housing 150 and hub segment 130 to define a pressure chamber 152 which is in fluid communication with a second pressure control valve 154 (FIG. 6) via a second flow pathway 156. A bevel-type apply spring 158 is located within drum segment 134 and is in engagement with piston 148 and apply plate 146. Apply spring 158 acts as a lever arm and functions to normally bias piston 148 toward piston housing 150 for exerting a clutch engagement force on apply plate 146 of sufficient magnitude to compress clutch pack 138 and rotatively couple carrier assembly 120 to mainshaft 54. With clutch pack 138 engaged, direct clutch assembly 62 is operating in its applied state and when clutch pack 138 is disengaged, direct clutch assembly 62 is operating in its released state. When it is desired to shift direct clutch assembly 62 into its released state, a volume of high pressure fluid is delivered from second control valve 154 to pressure chamber 152 via second flow pathway 156 for urging piston 148 to move away from piston housing 150 and cause apply spring 158 to resiliently deflect, thereby releasing apply plate 146 from clamped frictional engagement with clutch pack 138.

With continued reference to FIG. 4, low brake assembly 64 is shown to be a pressure-apply spring-release type of arrangement that is normally operable in a released state to permit rotation of ring gear 116 and is further operable in an applied state to prevent rotation of ring gear 116. Low brake assembly 64 includes a multi-plate clutch pack 160 that is disposed between housing 50 and ring gear 116. Clutch pack 160 includes a set of inner plates 162 splined to ring gear 116 and Which are interleaved with a set of outer plates 164 splined to housing 50. Clutch pack 160 is also located between a reaction plate 166 fixed to housing 50 and a piston 168 that is retained for sliding movement in a pressure chamber 170 defined by housing 50. Pressure chamber 170 is in fluid communication with second pressure control valve 154 via a third flow pathway 172. Inner and outer seal rings are provided to seal piston 160 relative to the inner and outer wall surfaces of pressure chamber 170. A return spring 174 acts on piston 160 for normally urging it away from clutch pack 160 so as to maintain low brake assembly 64 in its released state. When it is desired to shift low brake assembly 64 into its applied state, a volume of high pressure hydraulic fluid is delivered from second control valve 154 to pressure chamber 170 via third flow pathway 172 for urging piston 168 to move into engagement with clutch pack 160 and exert a clutch engagement force thereon of sufficient magnitude to hold ring gear 116 against rotation. As seen, a support plate 176 is secured for rotation with ring gear 116 and is supported for rotation relative to both carrier assembly 120 and housing 50 via a pair of thrust washers 178.

Transfer assembly 60 includes a drive sprocket 180 driven by carrier assembly 120, a driven sprocket 182 rotatably supported by bearings 184 on front output shaft 40, and a power chain 186 meshed therebetween. Drive sprocket 180 is rotatably mounted by a bearing assembly 188 on a hub segment of a valvebody assembly 190 that is fixed to housing 50 via bolts 192. As will be detailed, the various control valves and flow pathways are mounted to or associated with valve body assembly 190. An axial extension 194 of reaction plate 166 is fixed to drive sprocket 180 such that drive sprocket 180 rotates at a common speed with that of carrier assembly 120 regardless of whether direct clutch assembly 62 is applied or released. Since carrier assembly 120 is also directly coupled to rear output shaft 30, rotary power transferred from mainshaft 54 to carrier assembly 120 is delivered to both rear output shaft 30 and transfer assembly 60.

To provide means for selectively transferring drive torque from transfer assembly 60 to first output shaft 40, transfer case 16 includes transfer clutch assembly 66. When transfer clutch assembly 66 is operating in a released state, all drive torque is delivered to rear output shaft 30 and the motor vehicle is defined to be operating in a two-wheel drive (2WD) mode. When transfer clutch assembly 66 is operating in a fully-applied state, drive torque is split between rear output shaft 30 and first output shaft 40 to define a locked or part-time four-wheel drive (4WD-LOCKED) mode. An adaptive or on-demand four-wheel drive (4WD-AUTO) mode is provided by automatically controlling transfer clutch assembly 66 between its released and fully-engaged states so as to vary the torque split ratio between rear output shaft 30 and front output shaft 40 in the range between 100:0 and 50:50. Furthermore, by controlling coordinated actuation of direct clutch assembly 62 and low brake assembly 64, the three distinct drive modes defined above can be established with either of a high-range (i.e., direct drive) or low-range (reduction drive) ratio drive connection between mainshaft 54 and carrier assembly 120.

Figure 5:
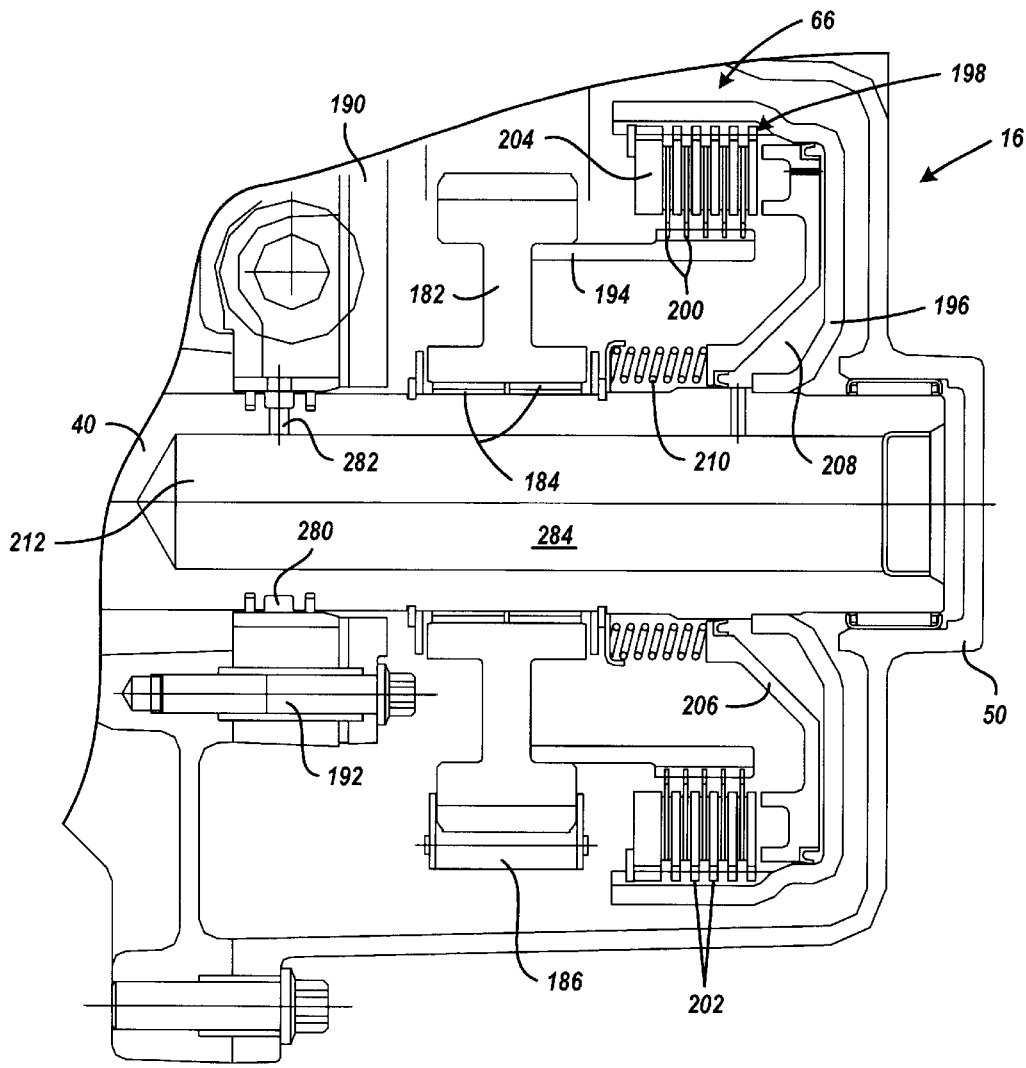
FIG. 5 is an enlarged partial sectional view of the transfer case showing the transfer clutch assembly in association with the front output shaft.
Figure 6:
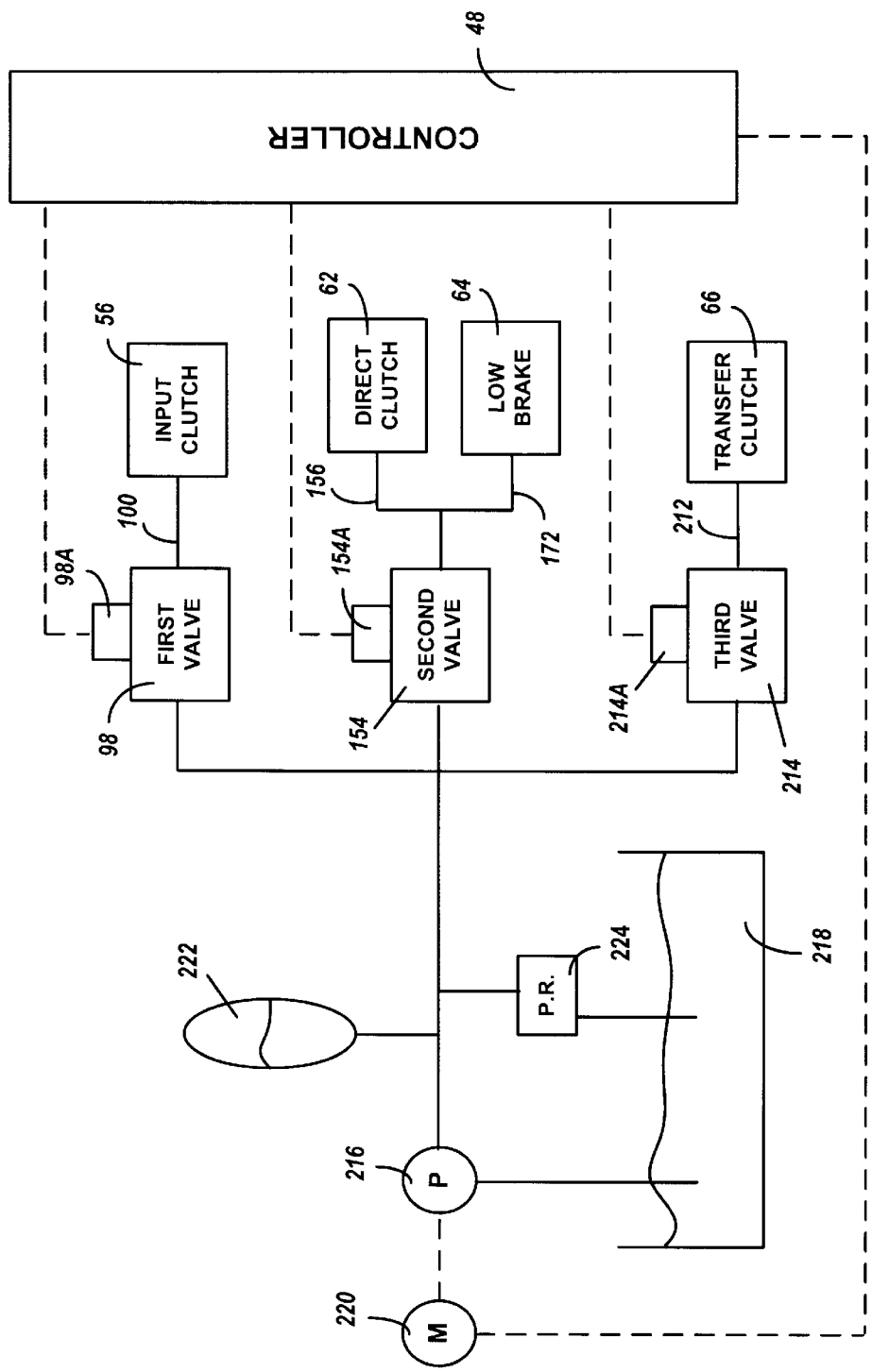
FIG. 6 is a schematic diagram of the hydraulic control system provided for controlling actuation of the various clutch and brake assemblies.

As best seen from FIG. 5, transfer clutch assembly 66 includes a drive hub 194 fixed to driven sprocket 182, a clutch drum 196 fixed to front output shaft 40, and a clutch pack 198 having inner plates 200 splined to drive hub 194 and which are interleaved with outer plates 202 splined to clutch drum 196. A reaction plate 204 is also fixed to drum 196. A piston 206 is disposed in a pressure chamber 208 defined between front output shaft 40 and drum 196 and is sealed relative thereto by inner and outer seal rings. A return spring 210 acts on piston 206 to normally bias it away from clutch pack 198 such that transfer clutch assembly 66 is a spring-released pressure applied arrangement normally operable in its released state. When it is desired to shift transfer case 16 from its two-wheel drive mode into either of its part-time or on-demand four-wheel drive modes, a volume of fluid is delivered to pressure chamber 208 through a fourth flow pathway 212 from a third pressure control valve 214 (FIG. 6). The part-time four-wheel drive mode is established when a maximum fluid pressure is delivered to pressure chamber 208 such that a corresponding maximum clutch engagement force is exerted by piston 206 on clutch pack 198. In the on-demand four-wheel drive mode, the fluid pressure delivered to pressure chamber 208 is regulated so as to vary the corresponding clutch engagement force exerted by piston 206 on clutch pack 198, thereby varying the amount of drive torque transfered between driven sprocket 182 and front output shaft 40.

FIG. 6 illustrates a schematic representation of the hydraulic clutch and brake control system associated with the present invention. In particular, a pump 216 is shown to draw hydraulic fluid from a reservoir or sump 218 provided within housing 50. A small electric motor 220 is provided to drive pump 216 for maintaining a desired fluid pressure in an internal accumulator 222 located at the inlet side of each of the control valves. A pressure regulator valve 224 is provided to maintain the desired fluid pressure downstream of accumulator 222. As previously disclosed, first control valve 98 is operable for controlling actuation of input clutch assembly 56, second control valve 154 is operable for controlling actuation of direct clutch assembly 62 and low brake assembly 64, and third control valve 214 is operable for controlling actuation of transfer clutch assembly 66. Preferably, each control valve is a PWM type of electrohydraulic valve having a solenoid-operated driver 98A, 154A, 214A receiving an electric control signal from controller 48. As noted, second control valve 154 controls concurrent actuation of two devices to define the high-range and low-range drive connections between mainshaft 54 and carrier assembly 120. Specifically, the direct ratio high-range drive connection between mainshaft 54 and carrier assembly 120 is established with direct clutch assembly 62 in its applied state and low brake assembly 64 in its release state. In contrast, the low-range drive connection is established with direct clutch assembly 62 in its released state and low brake assembly 64 in its applied state. These two distinct drive ratio connections can be established whether mainshaft 54 is driven exclusively by M/G unit 68 (the electric mode) with input clutch assembly 54 released or driven by engine 12 alone (the engine mode) or in conjunction with assist from M/G unit 68 (the hybrid mode) with input clutch assembly 54 applied. Preferably, the reduction ratio established by planetary gearset 58 is in the range of 2.0 to 5.0 to 1.0 and, more preferably, is 3.42:1 for a particular vehicular application now contemplated.

As noted, valvebody assembly 190 is rigidly secured within housing 50 and functions to provide fluid communication pathways between the three control valves and their corresponding pressure chambers. To this end, first flow pathway 100 includes one or more radial ports 226 formed through input shaft 52 which provide fluid communication between pressure chamber 96 and a circumferential chamber 228 formed in mainshaft 54. A pair of laterally-spaced seal rings on opposite sides of chamber 228 provide a fluid-tight seal between input shaft 52 and mainshaft 54. Chamber 228 communicates with one or more radial ports 230 in mainshaft 54 which, in turn, communicates with a long annular cavity 232 defined between the internal surface of mainshaft 54 and the outer surface of a separator tube 234 mounted inside of mainshaft 54. Cavity 232 communicates with a supply groove 236 formed in mainshaft 54 via a plurality of radial supply ports 238. Supply groove 236, in turn, communicates with a first supply chamber 240 formed in valvebody assembly 190. As seen, a pair of seal rings are provided to seal supply groove 236 relative to valvebody 190. While not shown,, supply chamber 240 is in fluid communication with the outlet of first control valve 98 via flow channels formed in valvebody assembly 190. An apertured journal braking or sleeve 242 is provided to support mainshaft 54 for rotation relative to valvebody 190.

To provide a fluid flow path between the outlet of second control valve 154 and pressure chamber 152 of direct clutch assembly 62, second flow pathway 156 includes a plurality of radial ports 250 extending through hub segment 130 of carrier 120 which communicate with a circumferential chamber 252 formed in mainshaft 54. Radial bores 254 permit fluid communication between chamber 252 and a long annular cavity 256 defined between the internal wall surface of mainshaft 54 and the outer wall of surface of a second separator tube 258. Cavity 256 communicates with radial supply ports 260 formed in a supply groove 262 in mainshaft 54 which, in turn, communicates with a second supply chamber (not shown) formed in valvebody 190. The second supply chamber is also in fluid communication with the outlet of second control valve 154 via flow channels formed in valvebody 190.

The outlet of second control valve 154 is also in fluid communication with pressure chamber 170 of low brake assembly 64 via third flow pathway 172. Third flow pathway 172 includes a supply hose 270 providing a fluid path between an aperture 272 in housing 50 and an aperture 274 in valvebody 190. Aperture 272 provides fluid communication to pressure chamber 170 while aperture 274 provides fluid communication to a third supply chamber 276 formed in valvebody 190. Third supply chamber 276 communicates with the outlet of second control valve 154.

Fourth flow pathway 212 includes an annular circumferential chamber 280 formed in front output shaft 40 which is in fluid communication with the outlet of third control valve 210 via suitable flow passages formed in valvebody 190. Radial ports 282 provide communication between chamber 280 and a sealed central cavity 284 formed in front output shaft 40. A plurality of radial supply ports 286 formed through front output shaft 40 permit fluid flow between cavity 284 and pressure chamber 208. While not shown, it is understood that the fluid discharged from each of the control valves is returned to internal sump 218.

The hybrid drive system of the present invention includes two drive power sources, namely internal combustion engine 12 and motor/generator 68. Power from engine 12 is transmitted to transmission 14 which, in turn, is delivered to transfer case 16 via the transmission output shaft. Transmission 14 can be of any known type (i.e., automatic, manual, automated manual, CVT) having a forward-reverse switching mechanism and a gearshift mechanism. Motor/generator 68 is connected to battery 46 and can be selectively placed in any of a DRIVE state, a CHARGING state, and a NO-LOAD state by controller 48. In the DRIVE state, motor/generator 68 functions as an electric motor which is driven by electric energy supplied from battery 46. In the CHARGING state, motor/generator 22 functions as an electric generator with regenerative braking (brake torque electrically generated by motor/generator 68) for storing electrical energy in battery 46. In the NO-LOAD state, the output (i.e., rotor 72) of motor/generator 68 is permitted to rotate freely.

As noted, control system 42 is provided for controlling operation of the hybrid powertrain shown in FIG. 1. Referring to FIG. 7, controller 48 is shown to receive input signals from various sensors and input devices previously identified cumulatively in FIG. 1 as vehicle sensors 44. Controller 48 is principally comprised of a microcomputer having a central processing unit (CPU), random-access memory (RAM), read-only memory (ROM), and an input-output actuator interface. Controller 48 performs data processing operations to execute various control routines according to control programs and/or maps stored in the ROM. Controller 48 receives data from an ignition switch 300, a gearshift lever switch 302, an accelerator position sensor 304, a brake status switch 306, a battery temperature sensor 308, a battery SOC (state of charge) sensor 310, and a throttle position sensor 312. In addition, other inputs include an engine speed sensor 314, a motor speed sensor 316, a rear shaft speed sensor 318, and a front shaft speed sensor 320. Ignition switch 300 is closed when the vehicle key is turned on. Assuming transmission 14 is of an automatic type, then "P", "N", "R", and "D" switches in gearshift selector switch 302 are closed when the gearshift mechanism is located in its Park (P), Neutral (N), Reverse (R) and Drive (D) positions, respectively. Accelerator position sensor 304 senses the depression angle of an accelerator pedal. Brake status switch 306 is turned on when the brake pedal is depressed. Battery temperature sensor 308 senses the temperature of battery 46. Battery SOC sensor 310 senses the charge level of battery 26. Throttle position sensor 312 senses the degree of opening of the engine throttle valve. Engine speed sensor 314 senses a parameter indicative of the rotary speed of the drive shaft of engine 12. Motor speed sensor 316 senses a parameter indicative of the rotary speed of rotor 72 of motor/generator 68. Rear speed sensor 318 senses the rotary speed of either rear output shaft 30 or rear propshaft 28 and can further be used as an indication of vehicle speed. Front speed sensor 320 senses the rotary speed of either front output shaft 40 or front prop shaft 38. A mode selector signal from a mode selector 298 controlled by the vehicle operator signals controller 48 of the desired drive mode (2WD, 4WD-LOCK or 4WD-AUTO) selected.

Based upon the operating information inputted to controller 48, a mode of operation of the hybrid powertrain is selected and controller 48 sends electric control signals to the various power-operated controlled devices. Specifically, controller 48 monitors and continuously controls actuation of motor/generator 68, solenoid driver 98A associated with input clutch assembly 56, solenoid driver 154A associated with direct clutch assembly 62 and low brake assembly 64, and solenoid driver 214A associated with transfer clutch assembly 66. Additionally, controller 48 monitors and controls various engine management systems for controlling the speed and torque generated by engine 12. These include a fuel injection system 322, an ignition timing system 324, and a valve timing system 326. A low voltage auxiliary battery 328 may serve as the power supply for controller 48.

There are four modes of operation for the hybrid vehicle, namely: (a) an electric mode; (b) an engine mode; (c) a hybrid; and (d) a regenerative mode. In the electric mode, only electric motor 68 provides motive power to the vehicle. In the hybrid mode, both engine 12 and electric motor 68 provide motive power to the vehicle. In the engine mode, only engine 12 provides motive power to the vehicle. In the regenerative mode, a portion of the engine power is absorbed by motor/generator 68 to charge battery 46. The transition from one mode to the next is smooth and transparent to the vehicle operator since controller 48 selects the most appropriate mode depending on various vehicle operating conditions including vehicle speed, accelerator demand and battery charge status.

Typically, the hybrid vehicle would begin operation in the electric mode with engine 12 stopped and input clutch assembly 56 and direct clutch assembly 64 released while low brake assembly 66 is applied. Motor/generator 68 is then shifted into its DRIVING state such that electric power is supplied to motor/generator 68 for causing rotor 72 to drive mainshaft 54 and sun gear 114 of planetary gearset 58 which, in turn, drives carrier assembly 120 at a reduced speed ratio. Unless operation in a 4WD mode is immediately needed, transfer clutch assembly 66 would be released such that motor 68 delivers all drive torque to rear driveline 18. During operation in the electric mode, it is contemplated that the vehicle may be driven up to about thirty miles per hour. This permits use of the electric mode in urban areas and stop and go driving so as to reduce the overall fuel consumption of the vehicle.

Figure 8:
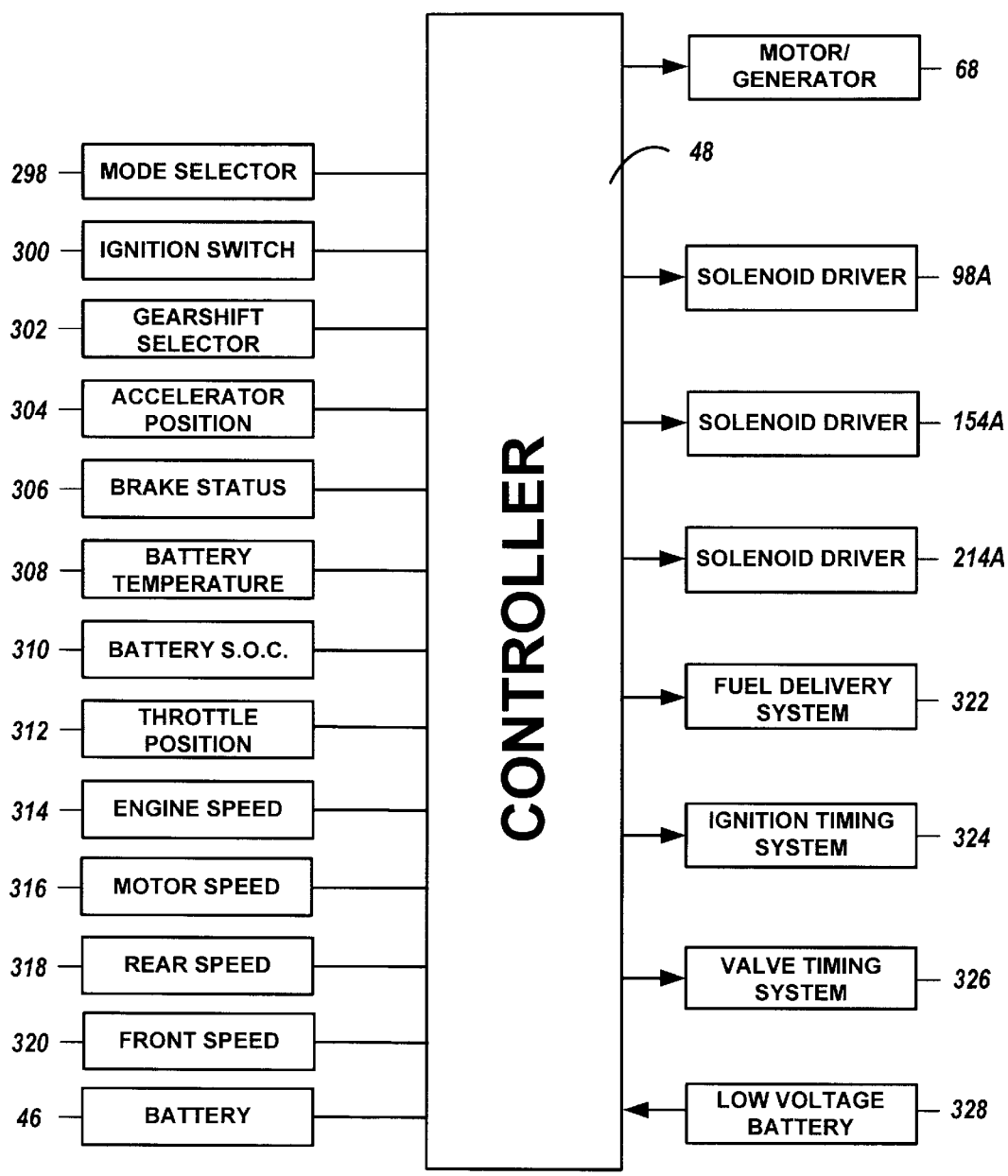
FIG. 8 is a chart showing the available modes of operation associated with hybrid powertrain of the present invention.

When shifting from the electric mode into the hybrid mode, motor/generator 68 can be used to start engine 12 (assuming a manual transmission) by engaging input clutch assembly 56 and increasing motor power. With engine 12 running, and input clutch assembly 56 engaged, drive hub 80 is coupled for rotation with mainshaft 54. Thus, in the hybrid mode, engine 12 and transmission 14 deliver power to rotor 72, while motor/generator 68 also delivers power to rotor 72, thereby providing a full range of power assist capability. Controller 48 controls engine torque via real-time control of the various engine management systems in conjunction with controlling the motor torque developed by motor/generator 68. Under light throttle conditions, motor/generator 22 may be optionally placed in its CHARGING state to recharge battery 26. FIG. 8 shows a chart of the various types of drive modes available.

When the operating conditions of the vehicle warrant operation in the engine mode, the hybrid drive system is switched by simply shifting motor/generator 68 into its no-load or OFF state and maintaining input clutch assembly 56 in its applied state. Alternately, motor/generator 68 can be shifted into its CHARGING state to provide regenerative braking.

In any of the electric, hybrid and engine modes of operation, motive power is delivered to both rear output shaft 60 and driven sprocket 182 of transfer assembly 60. Based on the particular drive mode selected (i.e., 2WD, 4WD-LOCK, 4WD-AUTO), controller 48 controls the actuated condition of transfer clutch 66. As such, various two-wheel drive and four-wheel drive modes are available at all times. Thus, the vehicle combines the commercially-successful features of a traditional four-wheel drive drivetrain architecture (engine, transmission and transfer case) with hybrid power control to significantly advance the hybrid drive technology. Moreover, the present invention provided an arrangement for a hybrid four-wheel drive vehicle which is not highly customized, but rather permits "drop-in" assembly of a hybrid transfer case in place of a conventional transfer case. This arrangement also permits the use of a smaller internal combustion engine that is sized for cruise operation while the electric assist of the motor/generator is capable of driving the vehicle at low speeds.

It is also contemplated that a power generation mode can be established with the motor vehicle stopped. Specifically, with input clutch assembly 62 applied and both direct clutch assembly 64 and low brake assembly 66 released, engine 12 can drive motor/generator 68 to provide auxiliary power and/or charge battery 46. If this mode is desired, a fourth control valve would be required to independently control actuation of low brake assembly 66 with second control valve 154 limited to actuation of direct clutch assembly 64. This is necessitated by the need to shift both low brake assembly 64 and direct clutch assembly 62 into their released states at the same time. Since both our released, no torque is transferred from mainshaft 54 to carrier assembly 120 so rotation of mainshaft 54 can be used exclusively to provide the power generation mode.

Transfer case 16 is shown to include a hydraulic power-operated clutch/brake actuation system since it can be accommodated within housing 50. However, it will be understood that an electromechanical clutch/brake actuation system using electromagnetic clutches can likewise be used. Also, transfer clutch 66 could be replaced with a mechanical locking-type (i.e., dog clutch) or a speed/torque sensitive coupling providing passive on-demand torque transfer (i.e., viscous couplings, hydraulic coupling, etc.).

A preferred embodiment of the invention has been disclosed to provide those skilled in the art an understanding of the best mode currently contemplated for the operation and construction of the four-wheel drive hybrid drive system. The invention being thus described, it will be obvious that various modifications can be made without departing from the true spirit and scope of the invention, and all such modifications as would be considered by those skilled in the art are intended to be included within the scope of the following claims.

I claim:

1. A transfer case for use in a motor vehicle having an engine and first and second drivelines, comprising:

an input shaft adapted to be driven by the engine;

a mainshaft;

an input clutch for selectively coupling said input shaft to said mainshaft;

a first output shaft adapted for connection to the first driveline;

a second output shaft adapted for connection to the second driveline;

a planetary gearset having a sun gear driven by said mainshaft, a ring gear, and planet gears rotatably supported from a carrier and which are meshed with said sun gear and said ring gear, said carrier operably connected to said first output shaft and a transfer assembly;

a direct clutch for selectively coupling said mainshaft to said carrier;

a low brake for selectively braking rotation of said ring gear;

a transfer clutch for transferring drive torque from said transfer assembly to said second output shaft; and an electric motor for selectively driving said mainshaft.

2. The transfer case of claim 1 wherein said input clutch is operable in a released state to release said mainshaft from driven engagement with said input shaft and is further operable in an applied state to couple said mainshaft for rotation with said input shaft, wherein said direct clutch is operable in a released state to permit relative rotation between said carrier and said mainshaft and is further operable in an applied state to couple said carrier for rotation with said mainshaft, and wherein said low brake is operable in a released state to permit rotation of said ring gear and is further operable in an applied state to brake said ring gear against rotation.

3. The transfer case of claim 2 wherein a high-range drive connection is established between said mainshaft and said carrier when said direct clutch is operating in its applied state and said low brake is in its released state, and wherein a low-range drive connection is established between said mainshaft and said carrier when said direct clutch is in its released state and said low brake is in its applied state.

4. The transfer case of claim 3 wherein said transfer clutch is operable in a released state such that all drive torque is transferred from said carrier to said first output shaft to define a two-wheel drive mode, said transfer clutch is further operable in an applied state such that drive torque is transferred from said carrier to both of said first and second output shafts to define a four-wheel drive mode.

5. The transfer case of claim 4 wherein an electric two-wheel high-range drive mode is established when said input clutch is released, said direct clutch is applied, low brake is released, said transfer clutch is released and said electric motor is actuated to drive said mainshaft.

6. The transfer case of claim 4 wherein a hybrid two-wheel high-range drive mode is established when said input clutch is applied, said direct clutch is applied, said low brake is released and said transfer clutch is released such that drive torque generated by said electric motor is combined with drive torque from the engine to drive said mainshaft.

7. The transfer case of claim 4 wherein an engine two-wheel high-range drive mode is established when said input clutch is applied, said direct clutch is applied, said low brake is released, said transfer clutch is released and said electric motor is off such that drive torque generated by the engine drives said mainshaft.

8. The transfer case of claim 4 wherein an electric two-wheel low-range drive mode is established when said input clutch is released, said direct clutch is released, said low brake is applied, said transfer clutch is released and said electric motor is activated to drive said mainshaft.

9. The transfer case of claim 4 wherein a hybrid two-wheel low-range drive mode is established when said input clutch is applied, said direct clutch is released, said low brake is applied and said transfer clutch is released such that drive torque generated by said electric motor is combined with drive torque from the engine to drive said mainshaft.

10. The transfer case of claim 4 wherein an engine two-wheel low-range drive mode is established when said input clutch is applied, said direct clutch is released, said low brake is applied, said transfer clutch is released and said electric motor is off such that drive torque generated by the engine drives said mainshaft.

11. The transfer case of claim 4 wherein an electric four-wheel high-range drive mode is established when said input clutch is released, said direct clutch is applied, said low brake is released, said transfer clutch is applied and said electric motor is activated to drive said mainshaft.

12. The transfer case of claim 11 wherein said transfer clutch can be fully engaged to define a locked four-wheel high-range drive mode or actuation of said transfer clutch can be varied to define an on-demand four-wheel high-range drive mode.

13. The transfer case of claim 4 wherein a hybrid four-wheel high-range drive mode is established when said input clutch is applied, said direct clutch is applied, said low brake is released, said transfer clutch is applied and drive torque generated by said electric motor is combined with drive torque from the engine to drive said mainshaft.

14. The transfer case of claim 13 wherein said transfer clutch can be fully engaged to define a locked four-wheel high-range drive mode or actuation of said transfer clutch can be varied to define an on-demand four-wheel high-range drive mode.

15. The transfer case of claim 4 wherein an engine four-wheel high-range drive mode is established when said input clutch is applied, said direct clutch is applied, said low brake is released, said transfer clutch is applied and said electric motor is off such that drive torque generated by the engine drives said mainshaft.

16. The transfer case of claim 15 wherein said transfer clutch can be fully engaged to define a locked four-wheel high-range drive mode or actuation of said transfer clutch can be varied to define an on-demand four-wheel high-range drive mode.

17. The transfer case of claim 4 wherein said input clutch is a spring-apply multi-plate clutch assembly operable disposed between said input shaft and said mainshaft, said input clutch is normally operable in its applied state and can be selectively shifted into its released state via actuation of a first power-operated actuator controlled by a control system.

18. The transfer case of claim 17 wherein said direct clutch is a spring-apply multi-plate clutch assembly operably disposed between said mainshaft and said carrier, said direct clutch is normally operable in its applied state and can be selectively shifted into its released state via actuation of a second power-operated actuator controlled by said control system.

19. The transfer case of claim 18 wherein said low brake is a spring-release multi-plate brake assembly operably disposed between said ring gear and a stationary member, said low brake is normally operable in its released state and can be selectively shifted into its applied state via actuation of said second power-operated actuator.

20. The transfer case of claim 19 wherein said transfer clutch is a spring-released multi-plate clutch assembly operably disposed between said transfer assembly and said second output shaft, said transfer clutch is normally operable in its released state and can be selectively shifted into its applied state via actuation of a third power-operated actuator.

21. The transfer case of claim 20 wherein said control system includes a controller and sensors for detecting operating characteristics of the vehicle and sending sensor signals to said controller, said controller operable to send control signals to said electric motor and said first, second and third actuators.

22. A transfer case for use in a motor vehicle having an engine and first and second drivelines, comprising:
an input shaft adapted to be driven by the engine;
a mainshaft;
an input clutch for selectively coupling said shaft to said mainshaft;
a first output shaft adapted for connection to the first driveline;
a second output shaft adapted for connection to the second driveline;
a planetary gearset having a sun gear driven by said mainshaft, a ring gear, and planet gears rotatably supported from a carrier and meshed with said sun gear and said ring gear, said carrier operably connected to said first output shaft and a transfer assembly;
a direct clutch for selectively coupling said mainshaft to said carrier;
a low brake for selectively braking rotation of said ring gear;
a transfer clutch for transferring drive torque from said transfer assembly to said second output shaft;
an electric motor for selectively driving said mainshaft; and
a control system for controlling actuation of said input clutch, said direct clutch, said low brake and said electric motor.

23. The transfer case of claim 22 wherein said control system is further operable to control actuation of said transfer clutch.

24. The transfer case of claim 22 wherein said electric motor includes a stator secured to a housing and a rotor secured to said mainshaft.

25. The transfer case of claim 22 wherein said carrier includes a first member fixed to said first output shaft and a second member defining a clutch drum, said direct clutch including a hub fixed to said mainshaft, and a clutch pack disposed between said clutch drum and hub.

26. The transfer case of claim 22 further comprising:
a valvebody supporting a first electrohydraulic control valve controlling actuation of said input clutch, a second electrohydraulic control valve controlling actuation of said direct clutch, and a third electrohydraulic control valve controlling actuation of said low brake; and
a hydraulic circuit providing high pressure fluid to said first, second and third control valves.

27. A hybrid motor vehicle, comprising:
a powertrain including an internal combustion engine and a transmission;
a first driveline including a first axle driving a pair of first wheels;
a second driveline including a second axle driving a pair of second wheels;
a transfer case including an input shaft driven by said powertrain, a mainshaft, an input clutch for selectively coupling said input shaft to said mainshaft, a first output shaft operably connected to said first driveline, a second output shaft operably connected to said second driveline, a planetary reduction unit having a sun gear driven by said mainshaft, a ring gear and planet gears meshed with said sun and ring gears, said planet gears rotatably supported from a carrier which is fixed to said first output shaft, a transfer unit driven by said carrier, a direct clutch for selectively coupling said mainshaft to said carrier, a low brake for selectively braking rotation of said ring gear, a transfer clutch for selectively transferring drive torque from said transfer unit to said second output shaft, and an electric motor for driving said mainshaft; and
a control system for controlling actuation of said input clutch, said direct clutch, said low brake and said electric motor for defining an electric drive mode, a hybrid drive mode and a powertrain drive mode.

28. The hybrid motor vehicle of claim 27 wherein said input clutch is operable in a released state to release said mainshaft from driven engagement with said input shaft and is further operable in an applied state to couple said mainshaft for rotation with said input shaft, wherein said direct clutch is operable in a released state to permit relative rotation between said carrier and said mainshaft and is further operable in an applied state to couple said carrier for rotation with said mainshaft, and wherein said low brake is operable in a released state to permit rotation of said ring gear and is further operable in an applied state to brake said ring gear against rotation.

29. The hybrid motor vehicle of claim 28 wherein a high-range drive connection is established between said mainshaft and said carrier when said direct clutch is operating in its applied state and said low brake is in its released state, and wherein a low-range drive connection is established between said mainshaft and said carrier when said direct clutch is in its released state and said low brake is in its applied state.

30. The hybrid motor vehicle of claim 29 wherein said transfer clutch is operable in a released state such that all drive torque is transferred from said carrier to said first output shaft to define a two-wheel drive mode, said transfer clutch is further operable in an applied state such that drive torque is transferred from said carrier to both of said first and second output shafts to define a four-wheel drive mode.

31. The hybrid motor vehicle of claim 30 wherein an electric two-wheel high-range drive mode is established when said input clutch is released, said direct clutch is applied, said low brake is released, said transfer clutch is released and said electric motor is actuated to drive said mainshaft.

32. The hybrid motor vehicle of claim 30 wherein a hybrid two-wheel high-range drive mode is established when said input clutch is applied, said direct clutch is applied, said low brake is released, said transfer clutch is released and drive torque generated by said electric motor is combined with drive torque from the engine to drive said mainshaft.

33. The hybrid motor vehicle of claim 30 wherein an engine two-wheel high-range drive mode is established when said input clutch is applied, said direct clutch is applied, said low brake is released, said transfer clutch is released and said electric motor is off such that drive torque generated by the engine drives said mainshaft.

34. The hybrid motor vehicle of claim 30 wherein an electric two-wheel low-range drive mode is established when said input clutch is released, said direct clutch is released, said low brake is applied, said transfer clutch is released and said electric motor is activated to drive said mainshaft.

35. The hybrid motor vehicle of claim 30 wherein a hybrid two-wheel low-range drive mode is established when said input clutch is applied, said direct clutch is released, said low brake is applied, said transfer clutch is released and drive torque generated by said electric motor is combined with drive torque from the engine to drive said mainshaft.

36. The hybrid motor vehicle of claim 30 wherein an engine two-wheel low-range drive mode is established when said input clutch is applied, said direct clutch is released, said low brake is applied, said transfer clutch is released and said electric motor is off such that drive torque generated by the engine drives said mainshaft.

37. The hybrid motor vehicle of claim 30 wherein an electric four-wheel high-range drive mode is established when said input clutch is released, said direct clutch is applied, said low brake is released, said transfer clutch is applied and said electric motor is activated to drive said mainshaft.

38. The hybrid motor vehicle of claim 37 wherein said transfer clutch can be fully engaged to define a locked four-wheel high-range drive mode or actuation of said transfer clutch can be varied to define an on-demand four-wheel high-range drive mode.

39. The hybrid motor vehicle of claim 30 wherein a hybrid four-wheel high-range drive mode is established when said input clutch is applied, said direct clutch is applied, said low brake is released, said transfer clutch is applied and drive torque generated by said electric motor is combined with drive torque from the engine to drive said mainshaft.

40. The hybrid motor vehicle of claim 39 wherein said transfer clutch can be fully engaged to define a locked four-wheel high-range drive mode or actuation of said transfer clutch can be varied to define an on-demand four-wheel high-range drive mode.

41. The hybrid motor vehicle of claim 30 wherein an engine four-wheel high-range drive mode is established when said input clutch is applied, said direct clutch is applied, said low brake is released, said transfer clutch is applied and said electric motor is off such that drive torque generated by the engine drives said mainshaft.

42. The hybrid motor vehicle of claim 41 wherein said transfer clutch can be fully engaged to define a locked four-wheel high-range drive mode or actuation of said transfer clutch can be varied to define an on-demand four-wheel high-range drive mode.

* * * * *